United States Patent
Jones et al.

(10) Patent No.: US 6,307,836 B1
(45) Date of Patent: *Oct. 23, 2001

(54) HIGH-SPEED TRANSPARENT ACCESS TO MULTIPLE SERVICES

(75) Inventors: Stephen K. Jones, Garland; Richard L. Kellerman, Plano, both of TX (US)

(73) Assignee: MCI Communications Corporation, Washington, DC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/988,081

(22) Filed: Dec. 10, 1997

(51) Int. Cl.[7] .................................................. H04Q 11/00
(52) U.S. Cl. .......................... 370/230; 370/437; 370/465
(58) Field of Search .................................. 709/228, 227; 370/353, 354, 395, 468, 522, 230, 236, 410, 524, 465, 437

(56) References Cited

U.S. PATENT DOCUMENTS

| | | | |
|---|---|---|---|
| 4,996,685 | * 2/1991 | Farese et al. | 370/468 |
| 5,231,649 | * 7/1993 | Duncanson | 370/468 |
| 5,446,730 | * 8/1995 | Lee et al. | 370/351 |
| 5,694,548 | * 12/1997 | Baugher et al. | 370/231 |
| 5,732,078 | * 3/1998 | Arango | 370/401 |
| 5,812,786 | 9/1998 | Seazholtz et al. | 709/233 |
| 5,862,126 | * 1/1999 | Shah | 370/230 |
| 5,872,771 | * 2/1999 | Park et al. | 370/230 |
| 5,886,980 | * 3/1999 | Zheng | 370/230 |
| 5,892,754 | * 4/1999 | Kompella et al. | 370/236 |
| 5,898,668 | * 4/1999 | Shaffer | 370/230 |
| 6,097,699 | * 8/2000 | Chen et al. | 370/230 |

* cited by examiner

*Primary Examiner*—Chau Nguyen
*Assistant Examiner*—Phuongchau Ba Nguyen (57) ABSTRACT

A system, method and computer program product are described, by which a user, through a control interface in a subscriber interface device, requests from network intelligence both transport network bandwidth and type of service line mode as part of call setup. An improved system by which requests to change access line mode and bandwidth are communicated over transmission facilities via D channels through local switch fabric to local or remote network intelligence is detailed. Connections over the transmission facilities, established between user B channels and B channels of transport bandwidth or between user B channels and the Stat Mux function, are described. An improved system is summarized, in which connections directly to transport bandwidth support point-to-point n B+D upstream and m B+D downstream service, and connections via stat mux allow connectionless traffic to share a portion of the transport bandwidth on an as needed basis. The ability to request and change access to available bit rate (ABR), variable bit rate (VBR) and constant bit rate (CBR) services, in a connection-oriented (CONS) or connectionless (CLNS) network, are described.

5 Claims, 4 Drawing Sheets

HIGH-SPEED TRANSPARENT ACCESS TO MULTIPLE SERVICES

BACKGROUND OF THE INVENTION

1. Field of the Invention

The present invention relates to communications networks. More particularly, this invention relates to communications network subscription services. Still more particularly, this invention relates to an improved method of selecting and accessing telecommunications network services.

2. Related Art

Modern homes and offices often connect to communications network subscription services for voice and data services. With increased business and consumer access to the Internet, subscriber demand for network bandwidth has increased substantially.

The expectation of "bandwidth-on-demand" was created by the Local Area Network (LAN). A LAN user shares a high-speed medium with many other users, having access to the full shared bandwidth on demand. In another version of bandwidth-on-demand, a user requests bandwidth, and is either granted the full request or is denied access completely, i.e. blocked. This second version is similar to a telephone call, where one either gets through or gets a busy signal.

Voice communications traffic can be forecasted and has a predictable character. Data communications traffic is quite different from voice communications. Data communications traffic can vary substantially over time. Key services and switching technologies in the emerging data market include Asynchronous Transfer Mode (ATM), Circuit switching, Frame relay, Internet Protocol (IP), N-ISDN, Private lines, SONET, Switched Multimegabit Data Service (SMDS) and X.25.

Users are moving towards using faster, larger, and more intelligent data communications networks, where the intelligence lies within the network, rather than outside the network. The term "intelligent network" is used to represent some level of "value-added" service provided by the network. Examples include intelligent routing decisions made within the network by route servers rather than predefined routes across the network and protocol conversion rather than just transparent protocol transport. Network intelligence can also mean a service offering based on centralized, intelligent, network-based devices. These devices act as information servers offering voice, video, imaging, routing and on-line service features. One example of such a server is a private on-line database service provider. Users want access to intelligent public data services in order to better leverage the intelligence within their own network. Users want flexible services which provide cost-effective network communications bandwidth.

With increased access to the Internet, Integrated Services Digital Network (ISDN) services have gained popularity. Modern ISDN services are available in several forms. ISDN Basic Rate Interface (BRI) is usually 144,000 bits per second and is designed for desktop computers, ISDN Primary Rate Service (PRI) is 1.544 Mbps DS1 or a 2.048 Mbps E-1 data rate channel and is designed for telephone switches, computer telephony and voice processing systems.

ISDN BRI service includes two 64 Kbps Bearer (B) channels for user data and one 16 Kbps Digital (D) channel for control, messaging, and network management. This service is commonly known as 2 B+D. ISDN PRI service in North America can be thought of as "enhanced T-1."

ISDN PRI service has 23 B channels and 1 D channel, each of which supports a full 64 Kbps. The D channel is used to carry signaling information for the other 23 B channels. Internationally, ISDN PRI has 30 B channels of 64 Kbps and two signaling channels. PRI was intended for use by higher bandwidth or shared customer devices such as a LAN, a personal computer, and a Private Branch Exchange (PBX).

After the definition of Broadband ISDN (B-ISDN), also known as Asynchronous Transfer Mode (ATM), the PRI and BRI ISDN standards are now referred to collectively as Narrowband ISDN (N-ISDN).

Another name for ISDN BRI channel is Digital Subscriber Line. Digital subscriber line is a three-channel digital line that links the ISDN customer's terminal to the telephone company switch with four ordinary copper telephone wires. The digital subscriber line is operated at the Basic Rate Interface (with two 64 Kbps circuit switched channels and one 16 Kbps packet switched channel). The digital subscriber line can carry both voice and data signals at the same time, in both directions. The digital subscriber line also carries the signaling data used for call information and customer data.

A digital loop carrier (hereafter DLC), refers to network transmission equipment used to provide network access. DLC is used in situations in which the cost of the terminating DLC equipment is more than offset by the savings in copper distribution accomplished by eliminating the need for as many individual copper pairs. DLC systems normally have two parts, a Central Office Terminal (COT) and a Remote terminal (RT). The central office terminal provides the multiplexing/demultiplexing function of individual voice signals to the composite multiplexed signal at the interface between the switching equipment and the DLC. The remote terminal provides the multiplexing/demultiplexing function at the interface between the individual subscriber pairs and the DLC.

The point of presence (POP) represents the physical place within a local access and transport area (LATA) where a long distance carrier or cellular provider interfaces with the network of the local exchange carrier (LEC) or local telephone company. A LATA is one of 16 local geographic areas in the U.S. within which local telephone companies may offer telecommunications services.

A digital subscriber loop (hereafter DSL), is the connection between an individual subscriber and a point of access to a shared data transport network or the point of presence. Often a digital subscriber loop is implemented by adapting an existing twisted wire pair that was previously intended as an analog telephone subscriber loop. Digital signals along a twisted wire pair may take the form of an ISDN n B+D signal, consisting of "n" number of bearer channels and a data channel for user-network signaling.

Data network services are categorized as being either connection-oriented or connectionless. Connection-oriented services involve establishing a connection between physical or logical end points of a network prior to the transfer of data. Examples of connection-oriented network services (CONS) are ATM and Frame Relay.

Connectionless data services provide end-to-end logical connectivity and do not require the establishment of a connection prior to data transfer. Examples of connectionless networking services (CLNS) are Internet Protocol (IP) and Switched Multimegabit Data Service (SMDS), mentioned above.

A given DSL subscriber may desire to carry video or other high rate data through the network using V.35, for example.

This requires an interface device at the subscriber site to encode and couple the signal onto the subscriber loop. A similar device must also reside at the network end of the access loop to receive the signal and convert it to a form suitable for transport within the network which may use ATM, frame relay, TDM or other technologies.

A different subscriber may desire to use the DSL for intermittent or "bursty" data transfer. For example, Internet communications tend to be characterized by occasional bursts of large data transfers from point to point. This use of the access line requires a subscriber-side interface device that provides a standard connection to the subscriber's equipment such as an Ethernet 10-base-T (10bT) LAN. As before, the device must couple the data onto the access line to be received by a complementary interface device at the network access point. From here, the data can be packetized and sent about the network which, in this case, serves as a WAN. This transport may use a connectionless approach because delay and arrival sequence of the data packets is not as critical.

Modern DSLs are functionally limited in several ways. Suppose that a subscriber contracts to use a given access line, including its transmission facilities and terminating equipment, in order to access constant bit rate services. The given access line (i.e., including access medium layers 1, 2, and 3 of the OSI model) is typically dedicated to a single application, such as, e.g., to serve as a constant bit rate (CBR) line for voice. Subsequently, if the subscriber also wants to subscribe to adjustable bit rate (ABR) services, then a separate access line must be allocated to provide such service, along with its own terminating equipment and transmission facilities. If then the subscriber wants to subscribe to some other form of variable bit rate (VBR) service, then additional duplicative transmission facilities and terminating equipment are required. The service supported by each given access line is predetermined by the choice of equipment installed at either end of the access line, as well as the limits of the transmission facilities leased. For practical reasons, a single access line is dedicated to providing one mode of traffic. A separate access line including a separate transmission facility and separate terminating equipment at both the subscriber and network ends is thus required for every mode of communications. Accordingly, if the same subscriber wants to use multiple types of services, then duplicate hardware and software equipment is required including separate networks with separate transmission facilities and separate terminating equipment. The present approach is inflexible, duplicative and expensive. This redundant approach is costly to both subscribers and also to network providers, both in terms of capital outlay and in terms of ongoing maintenance costs.

Different facilities are required for different high speed access products such as High-speed DSL (HDSL), Symmetric DSL (SDSL), Asymmetric DSL (ADSL), coaxial cable modem services, etc. Examples include a cable modem for data access over a coaxial cable system. Another example is a 768 Kbps SDSL modem with synchronous interface for video conferencing, versus 768 Kbps SDSL modem with Ethernet 10bT interface for data traffic. Access to each additional service requires additional hardware and software at both the network carrier and customer subscriber ends. Moreover, additional transmission facilities are required between the network and subscriber ends of the loop. Both vendors and customers must deploy multiple systems to support multiple services, resulting in additional cost of service to the customer.

Another approach has been tried to address this need. This approach uses ATM from the network to the customer. This approach requires additional expense per line.

Yet another approach transfers constant bit rate traffic over connectionless protocols. This approach potentially degrades performance depending on the circumstances.

Another approach which has been used employs constant bit rate access for bursty connectionless traffic. This approach results in less efficient use of access/transport bandwidth than would be optimal.

What is needed then, is the ability to provide a common high speed physical access facility to be used to access multiple services in a cost-effective manner.

SUMMARY OF THE INVENTION

The present invention comprises a technique by which a user conveys to network intelligence a request to operate a digital subscriber loop (DSL) in a particular manner. The technique first establishes a communications session. Second, the technique allows a user to communicate to a network intelligence device a first line mode of accessing the network. Third, the technique permits the user to request that the network intelligence device change the communications session to a second line mode of accessing the network. Requests for access line modes are made to the network intelligence via the network interface device. Access line modes include available bit rate (ABR), variable bit rate (VBR) and constant bit rate (CBR) applications. ABR, VBR and CBR access line modes are available for routing user signals in connection-oriented (CONS) or connectionless (CLNS) network systems fashions.

Features of the invention permit increasing and decreasing bandwidth allocated to the communications session, and changing the access line mode during the course of a communications session. The technique also permits a user to be an individual or a computer.

The invention further features steps of connecting the user signal through the local switch fabric to the transport network bandwidth. For CBR traffic, the system features verifying the network's ability to fulfill the user's constant bit rate request by performing at least one of the steps of validation, protocol negotiation, bit-rate negotiation, routing and handshaking. For ABR or VBR traffic, the system features the ability to cross-connect the user signal via the local switch fabric to the communications network through a statistical multiplexer and also to fit subsequent traffic onto the transport bandwidth.

An embodiment of the present invention includes a system having a subscriber interface device, a network interface device, a network intelligence device, and a communications network transmission facility such as a wired, wireless, or coaxially cabled network. Users select via the subscriber interface device a variable number (n) of upstream and (m) of downstream bearer (B) channels from the network over data (D) channels. Features of the subscriber interface device include a user control interface for D channel signaling, a user data port for data channel access, and support for constant bit rate (CBR), variable bit rate (VBR) and available bit rate (ABR) applications. The network interface device permits so-called "fanning out" of (n B+D) upstream and (m B+D) downstream channels. The transmission facility is coupled between the subscriber interface device and the network interface device, for transmitting the channels between them. Local switch fabric is coupled to the network interface device. A statistical multiplexer is coupled to the local switch fabric on the network side for selective coalescing and multiplexing of ABR and VBR data traffic from different sources. Transport network bandwidth is coupled through the local switch fabric to the "fanned out"

B channels of the network interface device. The system's network intelligence is logically coupled through the local switch fabric to the "fanned out" D channels of the network interface for negotiating bandwidth requests with the user.

Features of this invention enable the number of upstream and downstream channels to differ and enable the number of upstream and downstream channels to vary from call to call and within a call.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be described with reference to the accompanying drawings. In the drawings, like reference numbers generally indicate identical, functionally similar, and/or structurally similar elements. Also in the figures, the left most digit of each reference number corresponds to the figure in which the reference number is first used.

DETAILED DESCRIPTION OF THE INVENTION

The preferred embodiment of the invention is discussed in detail below. While specific implementations are discussed, it should be understood that this is done for illustration purposes only. A person skilled in the relevant art will recognize that other components and configurations may be used without departing from the spirit and scope of the claimed invention.

Overview of the Invention

The present invention is directed to a communications network system that allows a common high speed physical access facility to be used to access multiple services over a digital subscriber line, also referred to as a digital subscriber loop (DSL). The system provides for access to constant bit rate (CBR), available bit rate (ABR) and variable bit rate (VBR) services. Connectionless network services (CLNS) traffic (e.g., Internet access) and connection-oriented network services (CONS) traffic (e.g., LAN—LAN data transfer) are available for each of the CBR, ABR and VBR services.

The invention enables a user to convey to network intelligence a desire to operate a digital subscriber loop in a particular manner. The invention first enables establishing a communications session over a network. Via the communications session, the user communicates a desired access line mode to the network intelligence. Then the user can request that the network intelligence change the communications session to a different access line mode. The user can be either a computer or an individual.

The invention enables modifying the transport network bandwidth allocated to the communications session. The invention also allows access line mode changes to be performed during the course of a communications session.

The invention allows the network intelligence to cause the user signal to be routed as a connection through the network, for connection-oriented (CONS) traffic. The invention can also cause the user signal to be input into a statistical multiplexer to traverse the network in a connectionless fashion, for connectionless (CLNS) traffic.

The invention enables connecting the user signal through the local switch fabric to the transport network bandwidth, and verifying the networks ability to service the user's constant bit rate request by performing validation, protocol negotiation, bit-rate negotiation, routing and handshaking.

The invention also enables cross-connecting the user signal via the local switch fabric to the communications network through a statistical multiplexer, thus fitting subsequent traffic onto the transport network bandwidth.

The communications network transmission facilities of the invention can comprise a wired, wireless or coaxial cable television services network.

The communications network system includes a subscriber interface device for requesting and controlling the amount of bandwidth allocated for use by the user. The subscriber interface device includes a user control interface for data (D) channel signaling, a user data port for data channel access, and support for constant bit rate (CBR), variable bit rate (VBR) and available bit rate (ABR) applications. The communications network system also includes a network interface device for fanning out n number of bearer (B) channels and at least one data channel (n B+D) for upstream communication and m number of bearer (B) channels and at least one data channel (m B+D) for downstream communication. The communications network system has a transmission facility coupled between the subscriber interface device and the network interface device, for transmitting the channels between the interface devices. The communications network system also couples the local switch fabric to the network interface device. A statistical multiplexer is coupled to the local switch fabric on the network side for selectively coalescing data traffic of different forms from different sources. The communications network system couples the transport network bandwidth through the local switch fabric to the fanned out B channels of the network interface device. Finally, the system's network intelligence is logically coupled through the local switch fabric to the "fanned out" D channels of the network interface for negotiating bandwidth requests with the user.

The number of upstream channels need not be equal to the number of downstream ones. The number of upstream and downstream channels may also vary from call to call and within a call.

The subscriber interface device includes a user control interface for requesting and controlling network bandwidth from the communications network. The subscriber interface also has a user data port for user access to the network bandwidth. The subscriber interface device is coupled to a transmission facility for access to the upstream and downstream channels.

The network interface device supports "fanning out" channels from the transmission facility. The network interface device is coupled to a transmission facility for access to the n upstream and m downstream channels.

The statistical multiplexer (stat mux) supports selective engagement for certain subscriber signals. The stat mux supports coalescing the data signals from multiple subscribers, i.e. multiplexing the traffic, for delivery of a collective packetized signal to the transport network.

The invention handles constant bit rate (CBR), variable bit rate (VBR) and available bit rate (ABR) applications.

CBR, VBR and ABR services are available having CLNS or CONS services. This service flexibility results in economic savings to both the consumer and the carrier by consolidating access to multiple service types over one connection.

Implementation of the Invention

Figure 1:
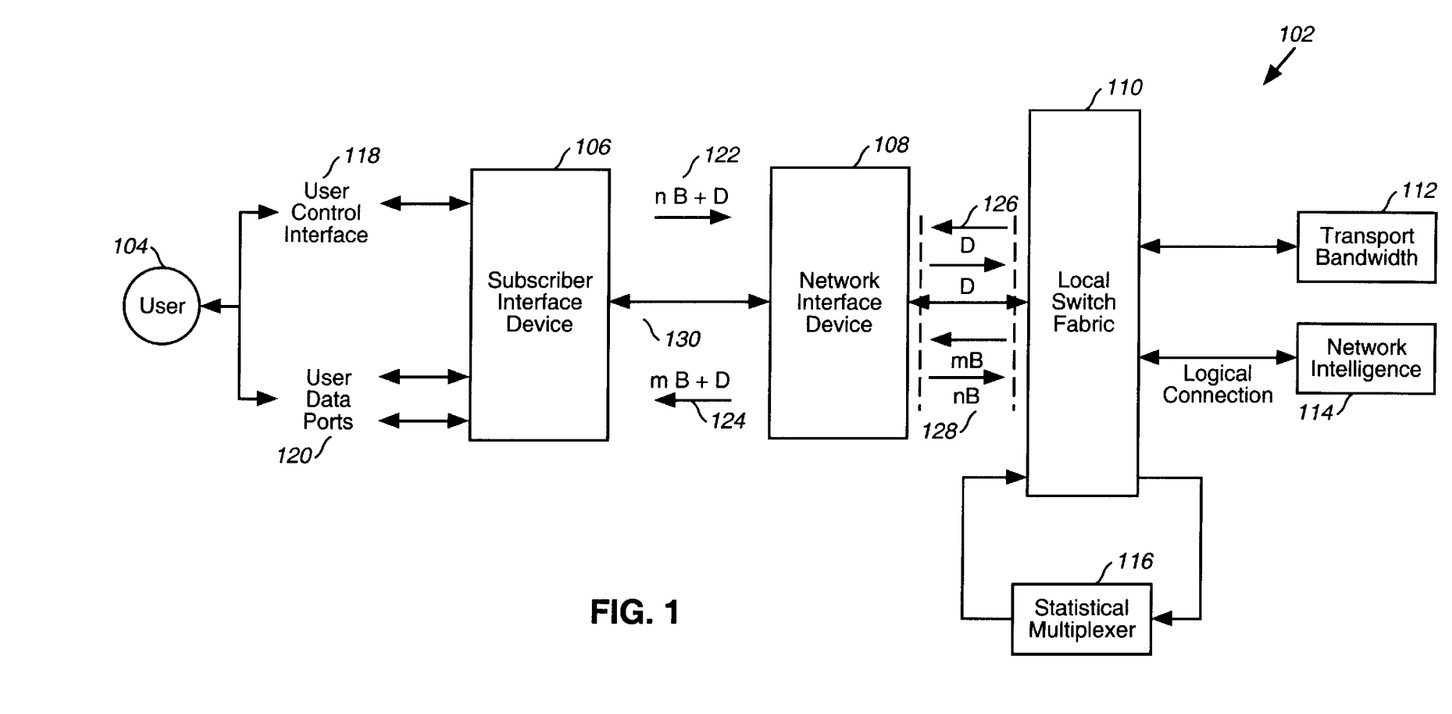
FIG. 1 is a block diagram of a communications network system of the present invention.
Figure 2:
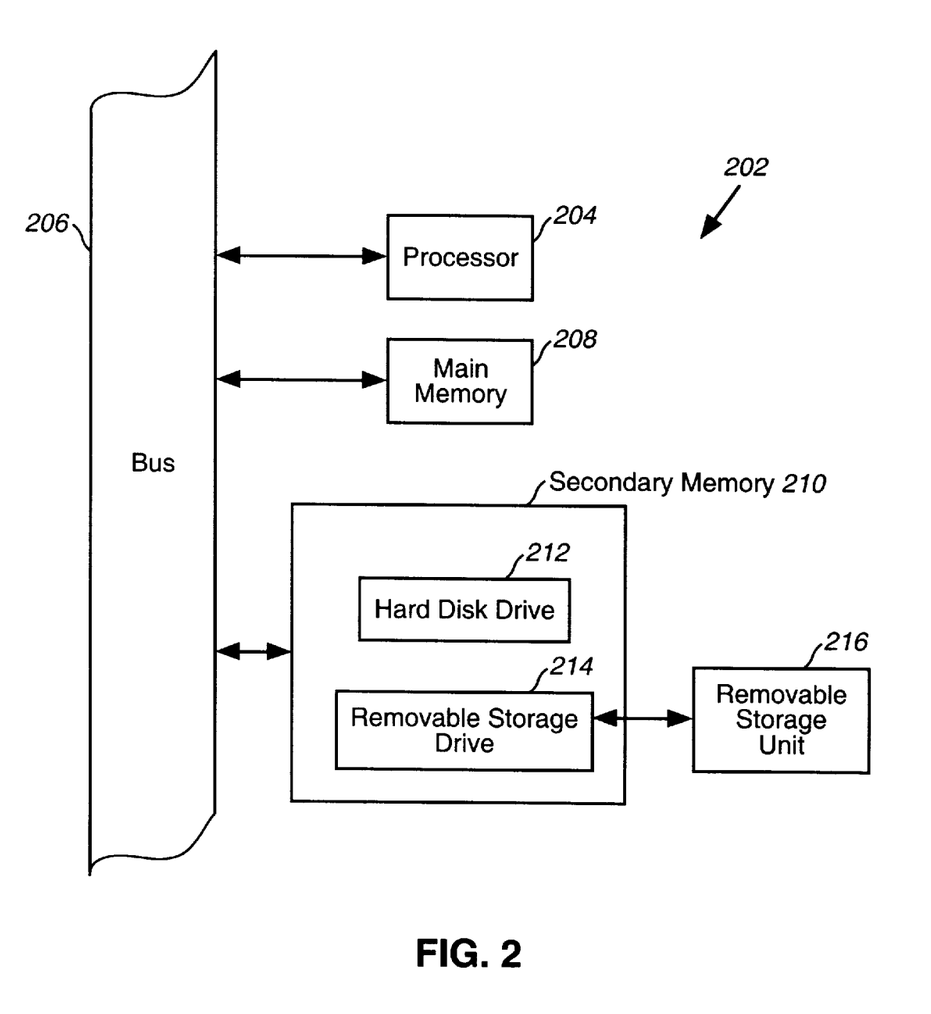
FIG. 2 is a block diagram of a computer system useful for implementing the present invention.

FIG. 1 is a block diagram depicting a digital subscriber loop (DSL) communications network 102 of the present invention. A user 104 (e.g., an individual or a computer 202 as depicted in FIG. 2) communicates through subscriber interface device 106. Subscriber interface device 106 is coupled through a digital loop carrier (DLC) to a network interface device 108 through which user 104 gains access to network resources. Network interface device 108 is in turn coupled to a local switch fabric 110 providing network access to subscriber interface device 106. Local switch fabric 110 couples network interface device 108 to a transport bandwidth 112, to facilitate allocation of bandwidth to subscriber interface device 106. A computer (such as computer system 202 of FIG. 2) running a network intelligence 114 program logically connects local switch fabric 110 to network interface device 108 enabling user 104 to select multiple services. In order to permit multiplexing of multiple phone calls, a statistical multiplexer 116 is also coupled to local switch fabric 110.

DSL communications network 102 permits user 104 to request bandwidth from network intelligence 114. Communications network system 102 also allows user 104 to negotiate with network intelligence 114 to gain access to authorized services. User 104 requests and negotiates via subscriber interface device 106. The negotiation process is further described in reference to FIG. 4, below.

Subscriber interface device 106 can be a remote terminal (RT). Subscriber interface device 106 is equipped with several interface ports including a user control interface 118 and one or more user data ports 120. User 104 controls subscriber interface device 106 by operating user control interface 118. User 104 sets up an initial service type selection and a contract between user 104 and a communications provider or carrier by manipulation of user control interface 118. User control interface 118 facilitates varying the amount of transport bandwidth 112 allocated to user 104 during the course of a call. User data ports 120 specially adapted to a particular service can be provided. Examples of user data ports 120 that can be provided with subscriber interface device 106 include an Ethernet 10baseT service, a DS1, a T1, a fractional T1 rate line, or a V.35 synchronous data line.

Subscriber interface device 106 communicates with network interface device 108 over a transmission facility 130. Network interface device 108 can be a central office terminal (COT). Transmission facility 130 can include a coaxial cable, a twisted pair or multiple twisted pair wire, an optical fiber, or other wired or wireless connections. Transmission facility 130 can be a digital loop carrier (DLC).

Upstream communication is accomplished over upstream channels 122 including 'n' number of Bearer and a Data (n B+D) upstream channels of bandwidth. Downstream communication is facilitated over downstream channels 124 including 'm' number of Bearer and a Data (m B+D) downstream channels of bandwidth. Thus, there are 'n' number of Bearer channels for upstream and 'm' number of Bearer channels for downstream communications. The quantity n need not be equal to m. The values of n and m can also vary from call to call. The values of n and m are limited by the physical limitations of the connection devices, e.g. transmission facilities 130. A subscriber can request any services for which the subscriber has contracted for access authorization. For example, a commercial enterprise subscriber can perhaps economically afford an optical fiber link with DS3 capacity as a means of connectivity, and may contract for such access, providing for a large n and m. On the other hand, a lower-end subscriber might be limited by the upper bounds of an XDSL modem which would provide a relatively smaller n and m.

Network interface device 108 provides the interface between local switch fabric 110 and network intelligence 114 on one end, and transmission facility 130 on the other. Network interface device 108 "fans out" or "breaks out" Data and Bearer channels 126 and 128, respectively. Network interface device 108 routes D channels 126 to network intelligence 114. For constant bit-rate traffic (CBR), network interface device 108 routes B channels 128 to directly connect local switch fabric 110 in TDM fashion to all B channels on transport bandwidth 112. Transport bandwidth 112 is at the point of presence or the network.

For ABR, VBR, Internet-type, bursty, or packet switched traffic, output of the local switch fabric 110 is routed back into statistical multiplexer 116, then back through local switch fabric 110 to transport bandwidth 112. The present invention provides for CBR, ABR and VBR, i.e. packet type, traffic using the transport bandwidth 112 of the network. The present invention supports CBR, ABR and VBR services employing the transport bandwidth 112 of the network for connection-oriented (CONS) or connectionless (CLNS) traffic.

Statistical multiplexer 116, also commonly referred to as a "stat mux", takes traffic which is in different forms and from different sources, i.e. different subscribers, and multiplexes the traffic into a CBR output which may in turn be connected to another stat mux 116, a switch or a data switch. This allows sharing of transport bandwidth 112 by multiple subscribers. Thus, stat mux 116 facilitates the sharing of transport bandwidth 112.

Network intelligence 114 permits the network to respond to subscriber application service requests. Network intelligence 114 can be thought of as computer logic running on a computer system 202 in the network.

An exemplary computer system 202, operating as discussed herein, is shown in FIG. 2. User 104 in an embodiment of the invention is a personal computer (PC) system running an operating system such as Windows 95/NT, OS/2, Mac/OS, or UNIX. However, the invention is not limited to these platforms. Instead, the invention can be implemented on any appropriate computer system running any appropriate operating system. Other components of the invention, such as the network intelligence 114, as already mentioned, could also be implemented using a computer system 202 such as that shown in FIG. 2. The computer system 202 includes one or more processors, such as processor 204. Processor 204 is connected to a communication bus 206.

The computer system 202 also includes a main memory 208, preferably random access memory (RAM), and a secondary memory 210. The secondary memory 210 includes, for example, a hard disk drive 212 and/or a removable storage drive 214, representing a floppy diskette drive, a magnetic tape drive, a compact disk drive, etc. The removable storage drive 214 reads from and/or writes to a removable storage unit 216 in a well known manner.

Removable storage unit 216, also called a program storage device or a computer program product, represents a floppy disk, magnetic tape, compact disk, etc. The removable storage unit 216 includes a computer usable storage medium having stored therein computer software and/or data, such as a program's object code and data.

Computer programs (also called computer control logic) are stored in main memory 208 and/or secondary memory 210 and/or removable storage units 216, also called computer program products. Such computer programs, when executed, enable the computer system 202 to perform the features of the present invention as discussed herein. In particular, the computer programs, when executed, enable the processor 204 to perform the features of the present invention. Accordingly, such computer programs represent controllers of the computer system 202.

In another embodiment, the invention is directed to a computer program product comprising a computer readable medium having control logic (computer software) stored therein. The control logic, when executed by the processor 204, causes processor 204 to perform the functions of the invention as described herein.

In yet another embodiment, the invention is implemented primarily in hardware using, for example, one or more state machines. Implementation of these state machines so as to perform the functions described herein will be apparent to persons skilled in the relevant art(s).

Figure 3:
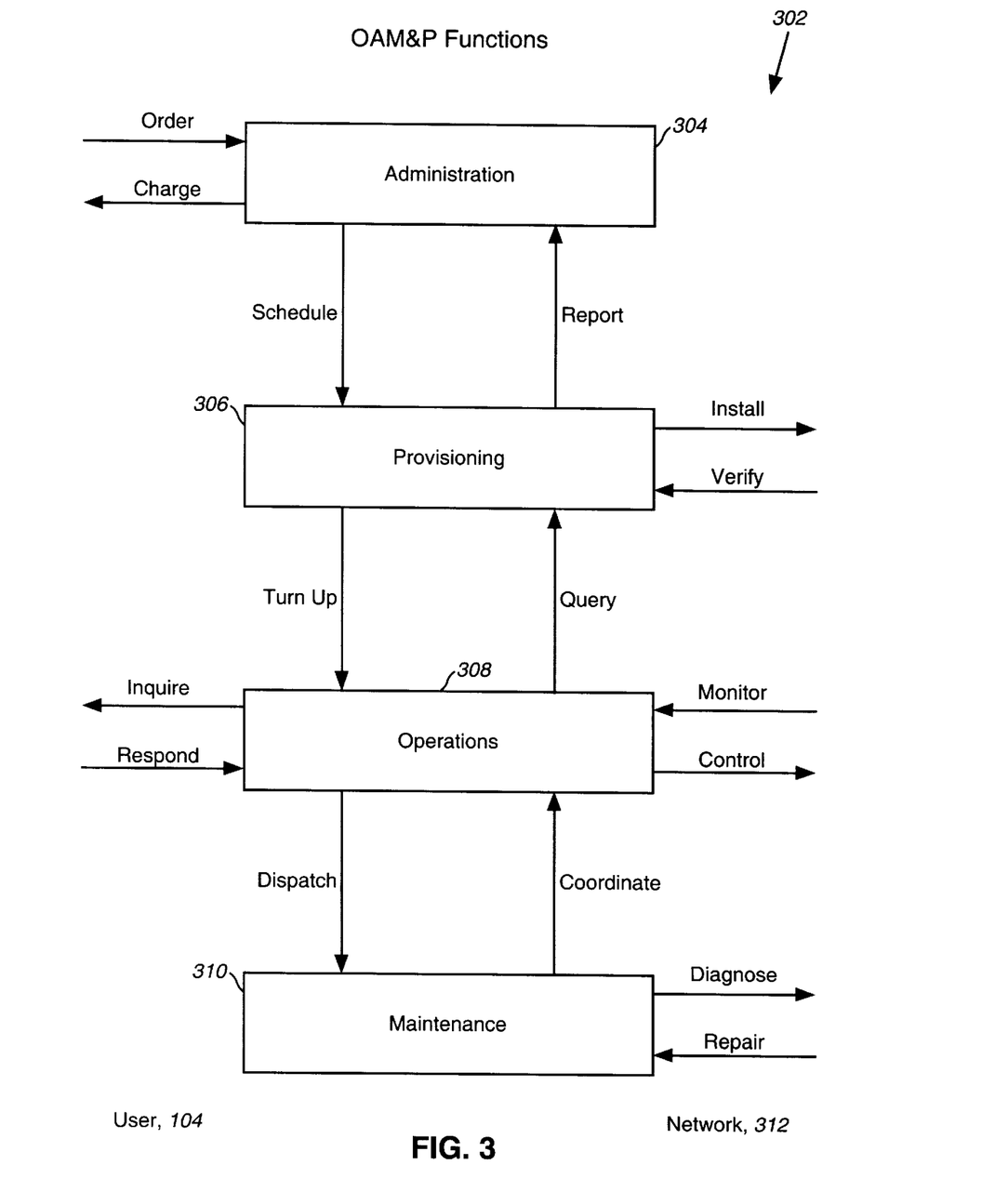
FIG. 3 is a block diagram of the operations, administration, maintenance, and provisioning process flow.

Operations, Administration, Maintenance, and Provisioning (OAM&P) stands for generic functions that describe almost all data communication networks. FIG. 3 depicts the OAM&P process flow 302. Administration 304 involves accepting orders from and charging user 104. Administration 304 involves activities associated with designing the network, processing orders, assigning addresses, tracking usage and accounting. Administration 304 sends scheduling information to and receives reports from, provisioning 306. Provisioning 306 installs and receives verification from network 312. Provisioning 306 involves installing equipment, setting parameters, verifying that the service is operational, and also deinstallation. Provisioning 306 gets queries from operations 308 responding to user 104 inquiries. Once provisioning 306 has tested that the installation is properly set up, it notifies operations that the service is operational. Operations 308 monitors the network. Operations 308 in the case of a fault invokes corrective or maintenance actions to repair the network. Operations 308 also responds to user 104 inquiries. Operations 308 dispatches and receives coordination from maintenance 310. Maintenance 310 diagnoses and repairs any network faults.

Network intelligence 114 permits the network to respond to subscriber application service requests to provide user 104 transport bandwidth 112. Provisioning 306 maintains the subscriber's service profile, i.e. a list of what services can be granted on a call by call basis. Call processing is performed in network intelligence 114. Call processing handles a call setup initial request and subsequent requests during the connection of the call to add or subtract transport bandwidth 112 within the subscriber's service profile. Call processing also performs functions of administration 304 including taking the subscriber's order and preparing billing according to transport bandwidth 112 usage and the terms of a subscriber agreement.

Software control logic at the client end, which may exist in user 104, subscriber interface device 106, or both, interfaces with the call processing application in network intelligence 114 to negotiate for transport bandwidth 112.

The International Telecommunications Union (ITU), an international telecommunications standards body founded in 1948, includes the Telecommunications standardization sector (ITU-T), formerly known as the CCITT. ITU has its general secretariat at the address Place de Nation, CH 1211, Geneva 20, Switzerland. The ITU-T publishes standards documents known as Recommendations represented by a decimal number. These recommendations when published are called "white books". Two notable ITU-T recommendations, Q.2931 and Q.931 which are incorporated herein by reference in their entirety, dictate the user control interface 118 at the functional interface level between subscriber interface device 106 and user 104. The functional interface definitions described in the recommendations, include what messages user 104 can request from the network and what responses the network can provide to the user 104. The recommendations also enumerate all the user data port 120 types available. The recommendations also describe the messages between subscriber interface device 106 and network interface device 108 at the link level to manage and control link 102. Most important of the ITU-T recommendations are the already mentioned Q.2931 which describes control functionality for broadband ISDN or ATM, and Q.931 which describes the control interface for Narrowband N-ISDN including ISDN PRI and ISDN BRI.

Using the ITU-T recommendations and the disclosure of the present invention, a person having ordinary skill in the art could build a subscriber interface device 106 and a network interface device 108 which would operate in accordance with the present invention.

Major functions defined in ITU-T Recommendation Q.2931 are signaling protocol; point-to-point connection setup and release; Virtual Path Identifier/Virtual Channel Identifier (VPI/VCI) selection and assignment; quality of service (QoS) class request; identification of calling party; basic error handling; communication of specific information in setup request; subaddress support; specification of peak cell rate (PCR) traffic parameters; transit network selection; regarding sending alerting messages to called party; regarding VPI/VCI selection or negotiation; regarding overlap sending; regarding interworking with N-ISDN; regarding subaddress support; and the number of transit networks which may be selected.

The signaling protocol specifies the sequence of messages that must be exchanged, the rules for verifying consistency of the parameters, and the actions to be taken in order to establish and release connections. Signaling protocols may be specified in several ways including semigraphical Specification Definition Language (SDL). The protocol described in recommendation Q.2931 is based upon the ISDN Q.931 and Frame Relay Q.933 protocols.

Figure 4:
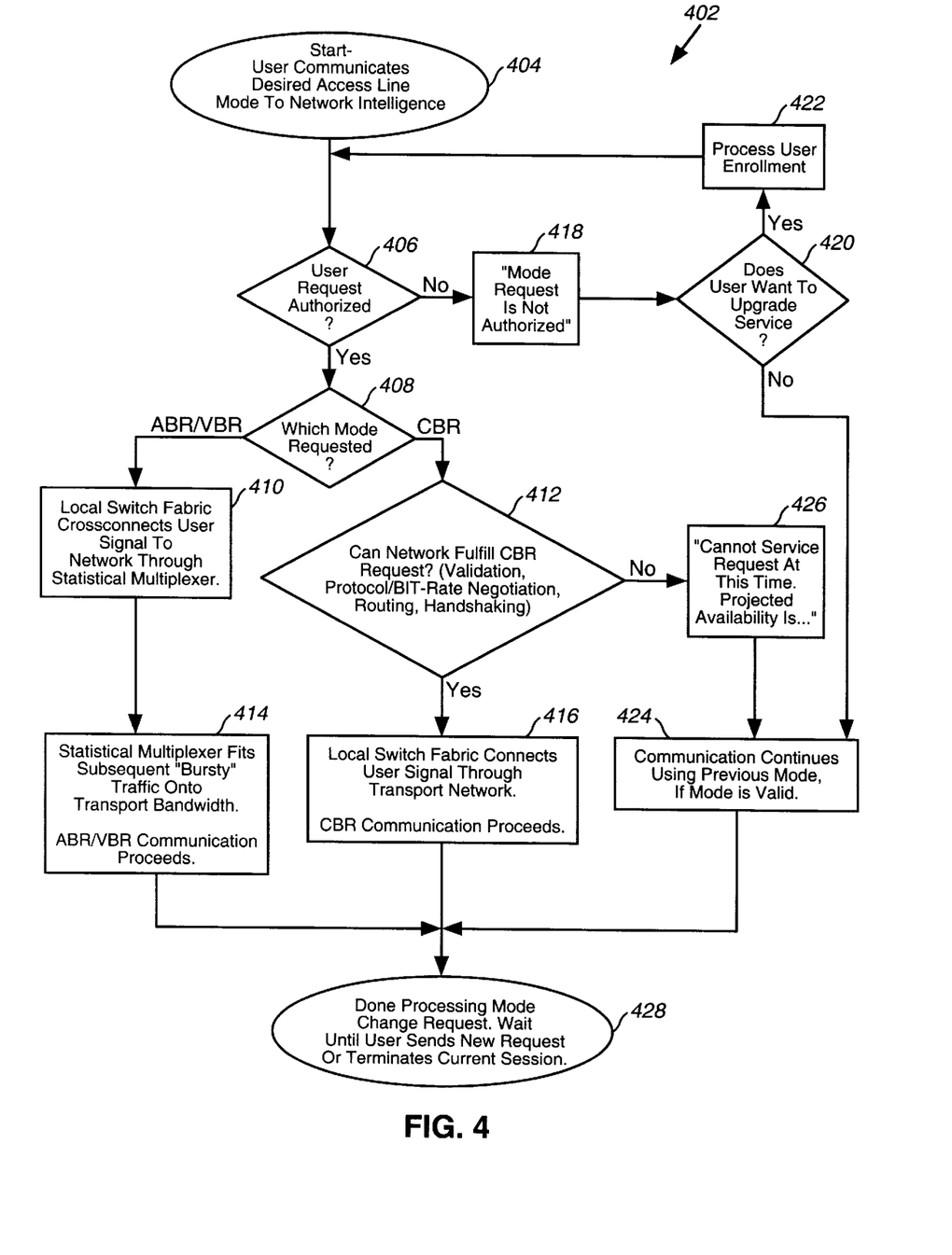
FIG. 4 is a flow diagram of the operational workflow of the present invention.

FIG. 4 depicts a flow diagram 402 of the operational workflow of the present invention. Flow diagram 402 begins with step 404, in which user 104 communicates a desired access line mode to network intelligence 114 through user control interface 118 and 'D' channel signaling. Operation continues with step 406. In step 406, network intelligence 114 performs an initial check to determine if user 104 is authorized to request the desired access line mode communicated in step 404. If network intelligence 114 verifies that user 104 is authorized to request the desired access line mode, then operation continues with step 408. If instead, in step 406, network intelligence 114 determines that user 104 is unauthorized to request the desired access line mode, then operation continues with step 418 to handle the request of user 104.

In step 418, network intelligence 114 notifies user 104 that user 104 is not authorized to use the requested access line mode. Operation continues immediately with step 420.

In step 420, user 104 is asked whether he would like to upgrade his subscription services to include the requested access line mode. If user 104 chooses to upgrade then operation proceeds to step 422. If user 104 does not choose to upgrade his subscription to the new service, then operation continues with 424.

In step 422. network intelligence 114 initiates the process of enrolling user 104 in the new service. Once user 104 is successfully enrolled, operation continues back at step 406. Operation in this case immediately branches to step 408, since user 104 is now authorized to request the desired service.

In step 408, operation branches dependent upon the access line mode requested. If in step 408, available bit rate mode (ABR) or variable bit rate mode (VBR) is selected, then operation branches to step 410. If constant bit rate (CBR) mode is selected, then operation branches to step 412.

In step 410, local switch fabric 110 crossconnects a user signal to the communications network through statistical multiplexer 116, and operations continues immediately with step 414. In step 414, statistical multiplexer 116 fits subsequent "bursty" traffic onto transport bandwidth 112. Also in step 414, ABR or VBR communication proceeds depending on which mode was selected originally by user 104. Operation continues with step 428.

In step 412, the network intelligence 114 verifies whether the network has sufficient unused capacity to fulfill the CBR request of user 104. The verification of step 412 entails processes of validation, protocol/bit-rate negotiation, routing, and handshaking. If network intelligence 114 determines that the network has sufficient capacity to fulfill the CBR request, then operation continues with step 416. If the network cannot fulfill the request, then operation continues immediately with step 426 to notify user 104.

In step 416, local switch fabric 110 connects the signal of user 104 through transport bandwidth 112 for CBR mode access. Also in step 416, CBR communication proceeds. Operation continues with step 428.

In step 426, network intelligence 114 notifies user 104 that the network cannot service the request of user 104 at the present time. Step 426 also provides a time of projected availability to user 104. Operation continues with step 424.

In step 424, after user 104 has either agreed to upgrade to the requisite service in step 420, or the network was unavailable in step 426, communication continues using the previous access line mode, if the previous mode is a valid access line mode. Operation continues with step 428.

In step 428, the access line mode change request of flow diagram 402 is complete and operation enters a wait state. Communication proceeds depending on the access line mode requested in flow diagram 402. The invention continues to wait until user 104 makes a new request for a different access line mode or chooses to terminate the current session. Thus, in step 428, the system first waits as communication proceeds, and then the request of user 104 is checked to determine whether a mode change has been requested. If an access line mode change is requested by user 104, then operation begins again at step 404. If user 104 terminates the current session, the session ends and operation of flow diagram 402 is complete.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method whereby a user may convey to network intelligence a desire to operate a digital subscriber loop in a particular manner, comprising the steps of:
    (a) establishing a communications session over a communications network;
    (b) communicating a first access line mode for the communications session to the network intelligence;
    (c) requesting that the network intelligence change to a second access line mode for the communications session;
    (d) modifying transport network bandwidth during the communications session based on a change to the second access line mode wherein said first and said second access line modes include at least one of available bit rate (ABR), variable bit rate (VBR) and constant bit rate (CBR) services comprising the network intelligence performing at least one of the following steps;
    (e) causing a user signal to be routed as a connection through the network; and
    (f) causing the user signal to be input into a statistical multiplexer to traverse the network in a connectionless fashion, wherein the available bit rate (ABR) and variable bit rate (VBR) services comprises the steps of:
        (1) cross-connecting via a local switch fabric the user signal to the communications network through the statistical multiplexer; and
        (2) fitting subsequent traffic onto the transport network bandwidth.

2. The method according to claim 1 wherein the communications network of step (a) comprises at least one of a coaxially cabled, a wired, and a wireless network.

3. The method according to claim 1, wherein the constant bit rate (CBR) services comprises the steps of:
    (1) verifying that the network can fulfill the user's CBR request including at least one of the following steps;
        (A) validating,
        (B) negotiating protocol,
        (C) negotiating bit-rate,
        (D) routing, and
        (E) handshaking; and
    (2) connecting via a local switch fabric the user signal through a transport network bandwidth.

4. A computer program product comprising a computer useable medium having computer program logic recorded thereon, said computer program logic, when executed, causing a processor to perform the steps of:

establishing a communications session over a communications network;

communicating a first access line mode for the communications session to a network intelligence;

requesting that the network intelligence change the communications session to a second access line mode;

modifying transport network bandwidth during the communications session based on a change to the second access line mode wherein said first and said second access line modes include at least one of available bit rate (ABR), variable bit rate (VBR) and constant bit rate (CBR) services comprising the network intelligence performing at least one of the following steps;

causing a user signal to be routed as a connection through the network; and causing the user signal to be input into a statistical multiplexer to traverse the network in connectionless fashion, wherein the available bit rate (ABR) and variable bit rate (VBR) services comprises the steps of:

cross-connecting via a local switch fabric the user signal to the communications network through the statistical multiplexer; and fitting subsequent traffic onto the transport network bandwidth.

5. The computer program product according to claim 4, wherein each of said first access line mode and said second access line mode includes at least one of an available bit rate (ABR) service, a variable bit rate (VBR) service, and a constant bit rate (CBR) service.

* * * * *